United States Patent

Harlaux et al.

[11] Patent Number: 5,427,816
[45] Date of Patent: Jun. 27, 1995

[54] PROCESS FOR COOKING A MASS OF SCRAMBLED EGGS

[75] Inventors: Ginette Harlaux, Beauvais; Gilles Poillot, L'Isle Adam, both of France

[73] Assignee: Nestec S.A., Vevey, Switzerland

[21] Appl. No.: 96,642

[22] Filed: Jul. 23, 1993

Related U.S. Application Data

[63] Continuation of Ser. No. 778,390, Oct. 16, 1991, abandoned.

[30] Foreign Application Priority Data

Nov. 10, 1990 [EP]  European Pat. Off. ........... 90121563

[51] Int. Cl.⁶ .................................................. A23L 1/32
[52] U.S. Cl. ..................................... 426/614; 99/474; 426/510; 426/519; 426/523
[58] Field of Search ............... 426/614, 523, 510, 519; 99/348, 353, 467, 484, 474, 516, 477, 453; 366/101, 165

[56] References Cited

U.S. PATENT DOCUMENTS

| | | | |
|---|---|---|---|
| 2,348,486 | 5/1944 | McCrosson | 99/516 |
| 2,999,024 | 9/1961 | Stimpson et al. | 426/510 |
| 3,565,638 | 2/1971 | Ziegler et al. | |
| 3,624,230 | 11/1971 | Robinson, Jr. | 426/510 |
| 3,958,035 | 5/1976 | Stearns et al. | |
| 3,987,212 | 10/1976 | Seeley et al. | 426/614 |
| 4,228,193 | 10/1980 | Schindler et al. | 426/510 |
| 4,425,367 | 1/1984 | Berkowitz et al. | 426/614 |
| 4,495,086 | 1/1985 | Hiyoshima et al. | 366/165 |
| 4,522,117 | 6/1985 | Weimer et al. | 99/348 |
| 4,534,283 | 8/1985 | Nakamuta | 99/516 |
| 4,862,793 | 9/1989 | Steiner | 99/353 |
| 5,281,431 | 1/1994 | Dunckel | 426/510 |

FOREIGN PATENT DOCUMENTS 60-232077  11/1985  Japan .

OTHER PUBLICATIONS

WPIL/Derwent Abstract No. 86-004515 of Tayio Japanese Kokai No. 60-232077 (1986).

Primary Examiner—Anthony J. Weier
Attorney, Agent, or Firm—Vogt & O'Donnell

[57] ABSTRACT

Scrambled eggs are prepared by cooking a mass of a homogeneous mixture of eggs, water and starch in an enclosure by introducing steam under pressure into the mass from within the mass and by heating a wall of the enclosure. The steam may be introduced into the mass from holes in a coil immersed in the mass.

8 Claims, 1 Drawing Sheet

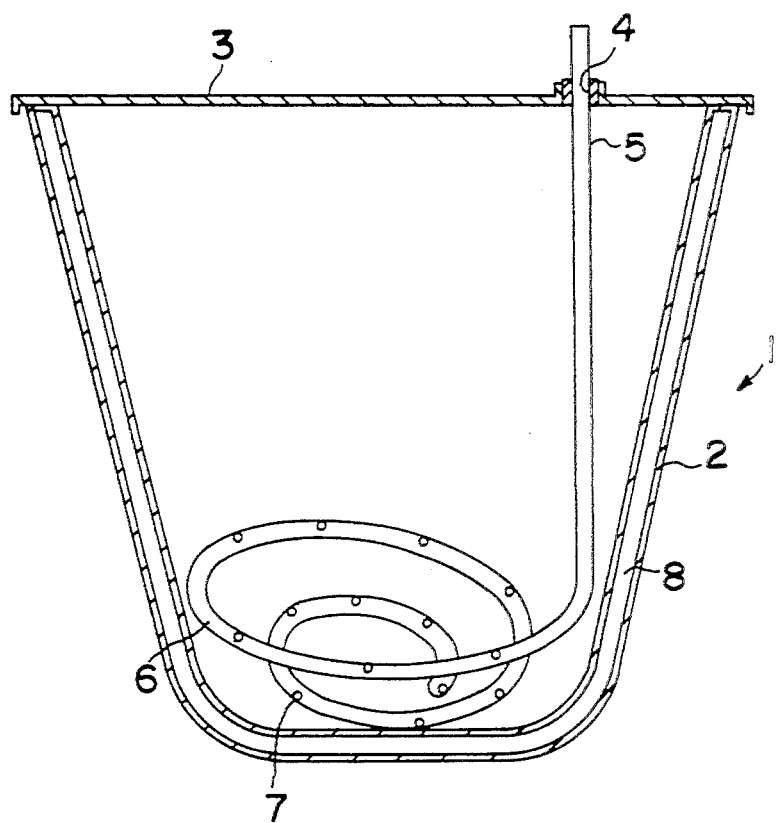

PROCESS FOR COOKING A MASS OF SCRAMBLED EGGS

CROSS REFERENCE TO RELATED APPLICATION

This application is a continuation application of application Ser. No. 07/778,390, filed Oct. 16, 1991, now abandoned.

BACKGROUND OF THE INVENTION

This invention relates to a process and an apparatus for cooking a mass of scrambled eggs.

It is often useful in the agricultural food industry to have available cooked scrambled eggs which can be incorporated in other ingredients to prepare a given dish, for example for deep-freezing.

So far as applicants are aware, there has hitherto been no way of cooking a mass of scrambled eggs amounting to several tens of kilograms.

The main problem involved, which has not yet been satisfactorily solved, is to be able homogeneously to cook a mass of scrambled eggs. More particularly, it would be useful if homogeneous and controlled coagulation could be ensured throughout the mass.

Accordingly, the problem addressed by the present invention was to provide a process and an apparatus for industrially cooking a mass of scrambled eggs amounting to several tens of kilograms.

The present invention relates to a process for preparing scrambled eggs by cooking a homogenized mass of eggs, in which water and starches have been incorporated, in an enclosure where steam under pressure is injected into the mass from within the mass, the enclosure being additionally heated through its wall.

The present invention also relates to an apparatus for carrying out the above process in which an injection system for injecting steam under pressure is arranged in an enclosure in a lower part thereof, the enclosure, as exemplified below, being closed in its upper part by a cover and comprising a double-jacketed tank in which a heating fluid circulates.

By virtue of the combination of cooking of the mass from outside by the double jacket and from inside by the injection of steam, the mass of scrambled eggs can be homogeneously coagulated, thus avoiding the appearance of overcooked parts and uncooked or undercooked parts.

Other features and advantages of the invention will become apparent from the following description in conjunction with the accompanying drawing provided solely by way of example.

The drawing figure is a diagrammatic partial vertical section through an apparatus according to the invention.

DETAILED DESCRIPTION OF THE DRAWING FIGURE

As can be seen from the drawing, the apparatus according to the invention has an enclosure formed by a tank 2 closed in its upper part by a fluid-tight removable cover 3.

The fluid-tight cover 3 is formed with a hole 4 through which passes a pipe 5 connected to a source of steam under pressure (not shown) from which the steam under pressure is injected.

The pipe 5 is extended downwards into the enclosure 1 by a hollow coil 6 formed with holes 7 large enough in diameter to allow the steam to pass through, but small enough to stop the mixture of scrambled eggs and possible additives in which the coil is immersed, from entering the interior of the coil 6 in view of the viscosity of the mixture. The holes 7 are preferably directed in such a way that the injection of steam under pressure produces a vortex in the mass of scrambled eggs.

The coil 6 is situated in the lower part of the tank 2, although it may be extended upwards according to the volume of scrambled eggs to be treated.

The tank 2 consists of a double jacket forming a space 8 in which a heating fluid, for example steam, is able to circulate.

In the process according to the invention, whole eggs, optionally salted and containing added yolks, water and starch, are beaten with a mixer of known type to form a homogeneous mixture.

The water and starch are added to avoid the hard egg texture which results from cooking at high temperature and thus enable a true scrambled egg texture to be obtained.

This homogeneous mixture is then placed in the enclosure 1 suitable for cooking under pressure which is closed by its cover 3. The enclosure 1 is preferably filled to such a level that the upper part of the coil 6 is level with the surface. The actual cooking process may then be started by injection of steam under pressure through the coil 6 and by circulation of steam in the double jacket forming the tank 2.

In a first step, cooking may preferably be carried out solely by injection of steam through the coil 6 and, in a second step, may preferably be carried out by the simultaneous effect of the injection of steam and the circulation of steam in the double jacket of the tank 2.

At the end of the cooking process when the desired degree of coagulation has been reached, the mixture is at a temperature of 80° C. to 90° C.

The product obtained should then be rapidly cooled to prevent further coagulation.

This may be done by removing the product from the enclosure and transferring the product obtained in the form of slices a few centimeters thick to baskets with holes which are immersed for a few minutes in a tank containing a mixture of water and ice. After cooling, the product is drained and, for example, may be cut into pieces of a certain size for incorporation in a recipe.

The process according to the invention is illustrated by the following Example.

EXAMPLE

A mixture consisting of 60.748 kg salted whole eggs, 9.345 kg salted egg yolks, 15.888 kg cold water and 3.738 kg starch, i.e., 89.719 kg in all, was homogenized and introduced into an enclosure 1 closed by its cover 3.

Steam under a pressure of 3 bar was introduced into the mixture for 8 minutes at a rate of 30 kg/h.

While injection of the steam continued, heating by the double jacket of the tank 2 was carried out for 7 minutes.

The total cooking time was therefore 15 minutes.

The cooked mixture was then immediately transferred to the cooling circuit.

50 mm thick slices of cooked eggs were placed in baskets drilled with holes which were themselves placed in a tank containing a mixture of water and ice flakes.

Cooling lasted 10 minutes, the final temperature of the product being 6° C. Thereafter, the product was drained for 10 minutes and then delivered to a cutting unit where it was cut into pieces for subsequent incorporation in a recipe.

We claim:

1. A process for preparing scrambled eggs comprising mixing eggs, water and starch to obtain a homogenized mixture mass of the eggs, water and starch, introducing the mass into an enclosure suitable for containing steam under pressure, injecting steam under pressure into the mass from within the mass to produce a vortex in the mass and to heat the mass and heating a wall of the enclosure for also heating the mass to obtain a cooked mass and then, removing the cooked mass from the enclosure.

2. A process according to claim 1 wherein the steam is injected into the mass by passing the steam through a coil to and through a plurality of holes in the coil which are immersed in the mass.

3. A process according to claim 1 further comprising cooling the cooked mass removed from the enclosure to prevent further coagulation of the cooked mass.

4. A process according to claim 1 further comprising mixing additional yolks with the eggs, water and starch to prepare the homogenized mixture mass.

5. A process for preparing scrambled eggs comprising mixing eggs, water and starch to obtain a homogenized mixture mass of the eggs, water and starch, introducing the mass into an enclosure suitable for containing steam under pressure, and then, firstly injecting steam under pressure into the mass from within the mass to produce a vortex in the mass and to cook the mass and secondly, continuing to inject steam into the mass from within the mass to continue producing a vortex and to continue cooking the mass and heating a wall of the enclosure to cook the mass to obtain a cooked mass and then, removing the cooked mass from the enclosure.

6. A process according to claim 5 wherein the steam is injected into the mass by passing the steam through a coil to and through a plurality of holes in the coil which are immersed in the mass.

7. A process according to claim 5 further comprising cooling the cooked mass removed from the enclosure to prevent further coagulation of the cooked mass.

8. A process according to claim 5 further comprising mixing additional yolks with the eggs, water and starch to prepare the homogenized mixture mass.

* * * * *